United States Patent [19]

Burroughs et al.

[11] 4,186,213

[45] Jan. 29, 1980

[54] METHOD OF FEEDING CATTLE FOR MAXIMIZED PROTEIN UTILIZATION

[75] Inventors: Wise Burroughs; Allen H. Trenkle, both of Ames, Iowa

[73] Assignee: Iowa State University Research Foundation, Inc., Ames, Iowa

[21] Appl. No.: 951,169

[22] Filed: Oct. 13, 1978

Related U.S. Application Data

[63] Continuation-in-part of Ser. No. 814,976, Jul. 12, 1977, abandoned.

[51] Int. Cl.² .............................................. A23K 1/00
[52] U.S. Cl. ............................................ 426/2; 426/69; 426/623; 426/630; 426/634; 426/636; 426/807
[58] Field of Search ................... 426/2, 69, 623, 630, 426/634, 636, 807

[56] References Cited

U.S. PATENT DOCUMENTS 3,619,200  11/1971  Ferguson et al. ..................... 426/2

OTHER PUBLICATIONS

Burroughs et al., "Protein Physiology and Application in the Lactating Cow", The Metabolizable Protein Feeding Standard, J. Am. Science, vol. 41, #3, pp. 933-944, 1975.

Primary Examiner—Robert L. Lindsay, Jr.
Attorney, Agent, or Firm—Tilton, Fallon, Lungmus & Chestnut

[57] ABSTRACT

The utilization of protein by cattle is maximized by feeding rumen-protected protein having a negative Urea Fermentation Potential (UFP) together with other unprotected protein-providing feed materials having a net positive UFP and urea.

18 Claims, No Drawings

METHOD OF FEEDING CATTLE FOR MAXIMIZED PROTEIN UTILIZATION

RELATED APPLICATION

This application is a continuation-in-part of copending application Ser. No. 814,976, filed July 12, 1977 now abandoned.

BACKGROUND AND PRIOR ART

Australian scientists in 1961 demonstrated conclusively that wool growth could be essentially doubled when milk protein was completely protected against rumen destruction. They administered the protein postruminally by surgical methods directly into the true stomach of lambs. During the past 15 years scientists throughout the world have attempted to apply the Australian findings to feeding procedures in which surgery was not involved; and which, if successful, could be utilized in cattle or sheep feeding practices. These attempts prior to the present invention were largely unsuccessful.

Faichney et al have reported on the feeding of protected protein (viz. formaldehyde-treated peanut meal) to calves. Faichney et al, *Aust. J. Agric. Res.*, 23, 167-175 (1972). Two protein levels were used. It was concluded that "formaldehyde treatment of peanut meal in the diet had no effect at the higher protein level and only a small, but consistent, effect at the lower protein level". Schmidt et al conducted several feeding tests in which formaldehyde-treated soybean protein was given to steers. Schmidt et al *J. Anim. Sci.*, 37, 1233-1237 (1973); and Schmidt et al, *J. Anim. Sci.*, 38, 645-653 (1974). The results were discouraging. In the comparative experiment reported in 1973, steers receiving untreated soybean meal supplement gained faster and tended to be more efficient than those receiving the protected soybean meal. Later tests confirmatory of these negative results were reported in the 1974 publication. No beneficial effect was found due to the treatment of the soybean protein with any of the levels of formaldehyde used.

U.S. Pat. No. 3,619,200, dated Nov. 9, 1971, describes the application to proteinaceous ruminant feed materials of a rumen resistant coating. The purpose of the coating is to protect the proteinaceous feed from microbial attack in the rumen while decomposing and permitting digestion of the feed within the abomasum and small intestine. Vegetable meals, fish meals, and a wide variety of natural proteinaceous feed materials are disclosed as useable with the rumen resistant coating. Example 2 describes the coating of fish meal and peanut meal which was mixed with equal parts of "lucerne chaff", which is understood to be an Australian term for ground alfalfa hay.

SUMMARY OF INVENTION

The present invention provides a method of feeding cattle to assure maximized protein utilization. One of the important ingredients of the novel feed ration is one which supplies metabolizable protein having a negative Urea Fermentation Potential (UFP) which material has been treated to reduce the solubility of the protein and protect it against rumen microbial destruction. In other words, the "protected" protein component of the feed ration is selected from that class of naturally-occurring protein feed sources which are not benefited by urea (negative UFP) when they are fed in the untreated form. At least one such protected negative UFP feed material is included in the feed. Further, in accordance with the method of the present invention, the protected negative UFP protein material is fed together with unprotected naturally-occurring protein-providing feed materials, having a positive UFP. More specifically, at least one of the unprotected feed materials should have a positive UFP value, and all of the unprotected materials as a group should have a net positive UFP value, for example from 0 up to 3.0. In some embodiments the net positive UFP value of the unprotected feed components may be substantially higher, including net positive values from 1 to 20. Urea is also included in the feed in an amount at least equal to the net positive UFP value of the unprotected feed components.

By the feeding method of the present invention, conditions can be maintained in the rumen and in the post-rumen digestion for optimized utilization of protein, for both the protected protein which passes unchanged through the rumen, and the unprotected protein converted to microbial protein in the rumen. The feeding method is particularly beneficial for young beef cattle, but it can also be employed as a routine feeding procedure to assure that maximized protein utilization will be obtained. Where cattle are subjected to stress conditions, such as shipment, or where they are just starting on a feed lot regimen and have not reached full feed, the method is of value in helping to compensate for the temporary feed inefficiency, promoting maximum protein utilization at an earlier time. Further, where the diet provides less than the full amount of energy which can be utilized by the cattle, or where the cattle are subject to unusual energy demands, such as lactating dairy cattle, the method has value.

DETAILED DESCRIPTION

In practicing the present invention, it is necessary to consider the Urea Fermentation Potential (UFP) of the feed materials. The UFP of feeds quantitatively evaluates the amount of urea that can be useful in any given cattle ration. A positive UFP value of a feed ration can be defined as the estimated grams of urea per kilogram of feed dry matter (DM) consumed that can be transformed into microbial protein in the forepart of the digestive tract of ruminants.

The basis for establishing UFP values of feed-stuffs involves the amount of fermentable energy present in a feed as reflected by its total digestible nutrients (TDN) content, and the amount of ammonia formed from feed protein degraded in the rumen. Burroughs et al have established a procedure for determining UFP values of any feed material, which is adopted as the definition of "UFP" for the purposes of this application. See Burroughs et al. *Vet. Med. Small Anim. Clin.*, 69, 713-722 (June 1974). The formula for computing UFP values is:

$$UFP = \frac{1.044\ TDN - B}{2.8}$$

The UFP values for different feeds are expressed as gm. urea (44.8% nitrogen)/kg. feed DM consumed. The value of 1.044 represents the estimated potential net grams of rumen microbial protein (10.44% of TDN) that result from consumption of each 10 gm of TDN. The letter B in the formula represents estimated gm. protein/kg. feed consumed that was degraded in the rumen and contribued its ammonia to the total rumen pool. The value 2.8 in the formula transforms protein to urea nitrogen equivalence.

Using the foregoing formula, UFP values were calculated for a wide variety of protein feeds, and tabulated for convenience of reference. Burroughs et al, *J. Anim. Sci.*, 41, Table 3, 938–940 (1975). See, also, Burroughs et al, *J. Dairy Sci.*, 58, 611–619 (1975). For the purpose of UFP computation, the total digestible nutrients (TDN) can be obtained from the tabulations in the cited publication, or can be computed. The TDN (Morrison, F. B., 1956, *Feeds and Feeding,* 22nd Edition, Unabridged, the Morrison Publishing Co., Ithaca, New York) of a feed is computed as the sum of all the digestible organic nutrients: protein, fiber nitrogen-free extract and fat (the latter being multiplied by 2.25 because its energy value for animals is approximately 2.25 times that of protein or carbohydrates).

Representative negative UFP protein sources for use in protected form in accordance with the present invention are shown below in Table A.

TABLE A
NEGATIVE UFP PROTEIN SOURCES FOR USE IN PROTECTED FORMS[1]

| Feed Material | Feed Composition | | UFP[4] |
| --- | --- | --- | --- |
| | %TDN | % Protein | (gm) |
| Coconut meal[2] | 74 | 22.1 | −34.3 |
| Cottonseed meal | 75 | 44.8 | −92.0 |
| Linseed meal | 81 | 38.8 | −73.7 |
| Peanut meal | 77 | 51.5 | −109.2 |
| Rape seed meal | 69 | 43.6 | −91.1 |
| Safflower meal | 55 | 23.3 | −41.9 |
| Soybean meal | 81 | 51.5 | −107.7 |
| Sunflower meal | 65 | 50.3 | −110.5 |
| Oat grain | 76 | 13.2 | −4.7 |
| Rye grain | 85 | 13.4 | −1.8 |
| Wheat grain | 88 | 14.3 | −2.9 |
| Fish meals | | | |
| herring | 76 | 76.7 | −177.1 |
| menhaden | 75 | 66.6 | −150.4 |
| Yeast, brewers | 78 | 47.9 | −99.2 |
| Alfalfa, aeiral part[5] | 59 | 17.8 | −38.4 |

Values from Burroughs et al, J. Anim. Sci., 41, Table 3, at 938–940 (1975).
All meals are solvent-extracted.
Total Digestible Nutrients.
Urea Fermentation Potential.
Average of values in reference table.

It will be understood that the negative UFP protein sources which may be used in protected form in practicing the present invention are not limited to those set out above in Table A, which are only set out as illustrative. Because of their relatively high protein content, one preferred class of negative UFP feed materials is vegetable oil meals, such as soybean, cottonseed, linseed, peanut, rape seed, safflower, and sunflower meals. The term "vegetable oil meal" as used herein is intended to refer to such meals which have been extracted to remove the oil. Another class of such feed materials is the cereal grains, such as oats, rye, and wheat. Other suitable negative UFP protein sources which can be used in protected form are tabulated in Burroughs et al, *J. Anim. Sci.,* 41, Table 3, 938–940 (1975). Hays and grasses such as alfalfa, have negative UFP values, and can be fed in protected form.

Several procedures are known for treating protein feeds to protect the protein from rumen digestion. These procedures reduce the solubility of the protein, thereby making it less subject to destruction in the rumen. For purposes of the present invention, a "protected" protein is defined as a protein feedstuff which has been treated to reduce the water solubility of the protein by a measurable amount.

The protein may be heated to reduce its water solubility or treated with chemical stabilizing agents, such as aldehydes or tannins. Examples of effective aldehydes are formaldehyde, glyoxal and glutaraldehyde. Examples of suitable tannins are tannic acid, wood molasses, dry hemicellulose power, hemicellulose molasses, and lignin sulfonate. The chemical stabilizing agents are preferably applied in a dilute water solution. A water solution in the amount of 2 to 50% by weight based on the dry weight of the feed material being treated is suitable.

The amount of treating agent to be applied depends on the amount of protein present in the feed, and the desired extent of insolubilization of the protein. Since such chemical treatment and heat treatments are known for protecting protein against rumen destruction, reference may be had to the published literature which includes the following:

HEAT PROTECTION

Abusalem, F., L. Hussein and Y. Foda 1975. Effect of some variables on extractability of protein, urease activity, free alpha-amino groups and soluble carbohydrates from soybean meals. Qualitosplantrum 24:247.

Chalmers, M. I., D. P. Cuthbertson and R. L. M. Synge. 1954. Ruminal ammonia formation in relation to the protein requirement of sheep. I. Duodenal administration and heat processing as factors influencing fate of casein supplements. J. Agr. Sci. 44:254.

Hudson, L. W., H. A. Glimp, C. O. Little and P. G. Woolfolk. 1970. Ruminal and postruminal nitrogen utilization by lambs fed heated soybean meal. J. Anim. Sci. 30:609.

Tagari, H., I. Ascarelli and A. Bondi. 1962. The influence of heating on the nutritive value of soya-bean meal for ruminants. British J. Nutr. 16:237.

TANNIN PROTECTION

Driedger, A. and E. E. Hatfield. 1972. Influence of tannins on the nutritive value of soybean meal for ruminants. J. Anim. Sci. 34:465.

Leroy, F. A., Z. Zelter, A. C. Francois, A. Chassin and J. Rodeau. 1970. Nitrogenous animal feeds. U.S. Pat. No. 3,507,662.

Tagari, H., Y. Hennis, T. Musha and R. Volcani. 1965. Effect of carob pod extract on cellulolysis, proteolysis, deamination and protein biosynthesis in an artificial rumen. Appl. Microbiol. 13:437.

Zelter, S. Z. and F. Leroy. 1966. Schultz der Nahrungsproteine gegen microbielle Desaminierung im Pansen. Z. Tierphysiol., Tierernaehr. Futtermittelkd. 22:39.

FORMALDEHYDE PROTECTION

Ferguson, K. A., J. A. Hemsley and P. J. Reis. 1967. Nutrition and wool growth. The effect of protecting dietary protein form microbial degradation in the rumen. Australian J. Sci. 30:215.

Ferguson, K. A. 1971. Method and food composition for feeding ruminants. U.S. Pat. No. 3,619,200.

Fraenkel-Conrat, H. and H. S. Olcott. 1948. Reaction of formaldehyde with proteins. VI. Cross-linking of amino groups with phenol, imidazole, or indoli groups. J. Biol. Chem. 174:827.

OTHER ALDEHYDES

Schmidt, S. P., N. J. Benevenga and N. A. Jorgensen, 1973. Effects of formaldehyde, glyoxal, or hexamethylenetetramine treatments of soybean meal on nitrogen utilization and growth in rates and in vitro rumen ammonia release. J. Anim. Sci. 37:1238.

In accordance with the present invention, the cattle ration should include at least one source of metabolizable protein having a negative UFP which has been treated to reduce the solubility of the protein and protect it against rumen destruction. If desired, the treatment may provide substantially 100% protection, that is, the protein will substantially all pass through the rumen without being digested and converted to microbial protein. If desired, more than one such protected negative UFP protein feed material can be used in the ration, which will also include other protein-providing feed materials used in unprotected form.

In practicing the present invention the cattle are fed a plurality of different naturally-occurring protein-providing feed materials. At least one of the feed materials comprises a source of metabolizable protein having a negative UFP which material has been treated by heat, or with aldehyde or tannin, or other protein-protecting chemical agent to reduce the solubility of the protein and protect it against rumen destruction. The rest of the naturally-occurring protein-providing feed materials are selected from unprotected feed materials at least one of which has a positive UFP. Others may have a positive UFP and others may have negative UFP, providing that the unprotected feed materials as a group have a net positive UFP. The unprotected feed materials as a group may have positive UFP in the range from 0 up to 3.0, or higher.

In most embodiments of the method of this invention, the net positive UFP of the unprotected feed materials will fall within the range from 1 to 20. The unprotected feed materials on a dry matter basis will usually comprise the major portion of the total diet. For example, the total of the protected feed materials may range from 3 to 45% by weight (dry matter basis) while the total of the unprotected feed materials may range from 55 to 97%. In preferred embodiments, the total of the protected feed materials may comprise from 10 to 25% by weight on a dry matter basis of the total of the protected and unprotected feed materials.

Representative positive UFP protein sources which are used in unprotected form are set out below in Table B.

TABLE B

POSITIVE UFP PROTEIN SOURCES FOR USE IN UNPROTECTED FORM[1]

| Feed Material | Feed Composition %TDN[2] | %Protein | UFP[3] (gm) |
|---|---|---|---|
| Barley straw | 41 | 4.1 | +4.3 |
| Beet molasses | 89 | 8.7 | +3.7 |
| Citrus pulp | 88 | 7.1 | +13.8 |
| Corn cobs | 47 | 2.8 | +10.0 |
| Corn grain | 91 | 10.0 | +11.8 |
| Corn stover | 59 | 5.9 | +6.2 |
| Cotton seed hulls | 41 | 4.3 | +3.8 |
| Rice grain | 84 | 8.2 | +10.8 |
| Sorghum grain | 83 | 12.5 | +7.7 |
| Sugarcane molasses | 91 | 4.3 | +20.1 |

[1]Values from Burroughs et al, J. Anim. Sci., 41, Table 3, at 939-940 (1975).
[2]Total Digestible Nutrients.
[3]Urea Fermentation Potential.

It will be understood that other positive UFP protein sources can be used, such as those tabulated in Burroughs et al. J. Anim. Sci., 41, Table 3, 938–940 (1975). In formulating the rations in accordance with the present invention, unprotected negative UFP protein sources can also be used.

In practicing the feeding method of the present invention, where the unprotected feed materials in the aggregate provide a net positive UFP, urea should be included in the ration. The amount of urea to be employed should at least equal the positive UFP of the feed, but may also include some excess, which can help maintain effective rumen action. For example diet A in Table G contains three unprotected feeds (corncobs, corn grain and cane molasses) each of which have positive UFP values such that a total of 1.08% urea is needed in satisfying their respective positive UFP's. Thus, one may choose to feed a 25% excess of the 1.08 minimum level or 1.35% (1.08×1.25=1.35%) urea for best rumen activity.

The relative amounts of protected and unprotected proteins in the ration can vary over a wide range. However, at least 3 to 4% by weight should be used in protected form. For example, from 3 to 45% by weight on a dry matter basis of the protein-providing feed materials may be treated to reduce the solubility of the protein thereof and protect it against rumen destruction. The protein may be from 10 to 100% protected, but full protection is preferred. However, it is not desirable to use such stringent conditions that the digestibility of the protein post-rumenally is interferred with.

The method of this invention has particular advantage for use with young beef cattle. Preferably, the feeding in accordance with the method of this invention is started when the beef cattle have a body weight of from 150 to 500 lbs. The feeding may be advantageously continued until the beef cattle have body weights in the range of 600 to 800 lbs. The method may also be advantageously applied to lactating dairy cattle. The following examples illustrate applications of the method to both beef cattle and dairy cattle.

EXAMPLE I

The results of treating soybean meal with 0.4 and 0.6 percent formaldehyde when incorporating the respective meals in totally mixed diets at an average rate (dry matter basis) of 6 percent are given in Table C. Also given in Table C are cattle results when incorporating untreated soybean meal at the 6 percent level and for comparative purposes at a much higher level of 19 percent. Each of the respective four diets were fed for a period of 110 days and each contained a similar amount of (1) crude protein, 12 percent; (2) energy, 61 percent TDN; (3) minerals; (4) supplemental vitamin A; and (5) Rumensin. They, in addition to soybean meal, contained approximately 60 percent ground corncobs, 20 percent corn grain, and 12 percent cane molasses. Urea was fed at the rate of 1.8 percent in the three diets containing 6 percent soybean meal. No urea was included in the diet containing 19 percent soybean meal.

Cattle live weight gains were increased 19 to 31 percent by formaldehyde treatment of soybean meal when compared with a similar diet in all respects except the soybean meal was untreated. Feed utilization expressed as pounds of feed dry matter consumed per pound live weight gain was improved 16 to 20 percent by the formaldehyde treatment. Similarly, feed costs per pound of gain using current feed prices were decreased from 37¢ to 30 to 31¢ as a result of formaldehyde treatment.

reduced by 5 percent and molasses and cobs increased a small amount.

TABLE C

Formaldehyde Treatment of Soybean Meal in Cattle Supplements (110-Day Feeding Trial)

| All diets contained 12% crude protein | Diets with 6% SBM + Urea | | | 19% SBM untreated |
|---|---|---|---|---|
| | Untreated meal | 0.4% F-hyde[d] | 0.6% F-hyde[d] | |
| Daily feed/animal, lb.[a] | 14.7 | 14.9 | 15.5 | 15.5 |
| Daily gain/animal, lb.[b] | 1.64 | 1.95 | 2.15 | 2.17 |
| Imp. over untreated meal + urea | — | 19% | 31% | — |
| Feed/gain, lb. | 9.0 | 7.6 | 7.2 | 7.1 |
| Imp. over untreated meal + urea | — | 16% | 20% | — |
| Feed cost/lb. gain[c] | 37 cents | 31 cents | 30 cents | 37 cents |

[a]Dry matter basis: 60% corncobs, 40% concentrates. Moisture content of diet was 15.7%.
[b]Two pens of 6 steers each fullfed each diet, average initial weight 440 pounds/animal.
[c]Feed prices assigned on as-fed moisture basis: corn $2.24/bu.; cobs $40.00/ton; molasses $70.00/ton; soybean meal $240.00/ton; urea and additives $200.00/ton.
[d]The soybean meal was treated with a 7 percent aqueous solution supplying formaldehyde equal to 0.4 or 0.6 percent of the meal dry matter. The treated meal was then permitted to react a minimum of 12 hours before incorporation into cattle diets.

EXAMPLE II

The results of treating soybean meal with wood molasses (Masonex), a combination of Masonex and formaldehyde, and additional toasting are presented in Table D. Masonex is the trade name of the Masonite Corporation for their product produced during the manufacture of hard boards used by the Building Industry. The principal organic constituents in this product are sugars. Some phenolic compounds such as tannic acid are present in small amounts. In this experiment, the treated meals on a dry matter basis were incorporated at a level of 7 percent in totally mixed diets. Also, cattle results are presented in which untreated soybean meal was fed at the 7 percent rate and at a much higher level of 20 percent.

All five diets contained a similar amount of (1) crude protein, 13 percent; (2) energy, 60 percent TDN; (3) minerals; (4) supplemental vitamin A; and (5) Rumensin. In addition to soybean meal, their approximate dry matter composition was ground corncobs 60 percent, corn grain 15 percent, and cane molasses 15 percent. Urea was fed at the 2 percent level in the diets containing 7 percent soybean meal, whereas no urea was included in the diet containing 20 percent soybean meal. In general, the diets fed in this experiment, except for the treatment meals, were rather similar to the diets fed in the experiment of Example I, except that corn was reduced by 5 percent and molasses and cobs increased a small amount.

Live weight gains of the cattle receiving the treated meals and urea were from 38 to 56 percent greater than those receiving a similar amount of untreated meal and urea. Feed utilization expressed as pounds of feed required per pound of gain was improved from 20 to 26 percent by the various treatments. Similarly, feed costs per pound of gain were reduced from 40¢ down to 30 to 32¢ as a result of the meal treatments.

TABLE D

Wood Molasses vs. Heat vs. Formaldehyde Treatment of Soybean Meal in Cattle Supplements (126-Day Feeding Trial)

| All diets contained 13% crude protein | Diets with 7% SBM + Urea | | | | 20% SBM untreated |
|---|---|---|---|---|---|
| | Untreated meal | Masonex treated[d] | Maxonex +F-hyde[d] | Heat treated[e] | |
| Daily feed/animal, lb.[a] | 12.0 | 13.0 | 13.1 | 14.1 | 14.1 |
| Daily gain/animal, lb.[b] | 1.23 | 1.70 | 1.80 | 1.92 | 2.01 |
| Imp. over untreated meal + urea | — | 38% | 46% | 56% | — |
| Feed/gain, lb. | 9.8 | 7.8 | 7.3 | 7.3 | 7.0 |
| Imp. over untreated meal + urea | — | 20% | 26% | 26% | — |
| Feed cost/lb. gain[c] | 40 cents | 32 cents | 30 cents | 30 cents | 37 cents |

[a]Dry matter basis: 60% corncobs, 40% concentrates. Moisture content of diet was 16.9%.
[b]Two pens of 6 steers each fullfed each diet, average initial weight 415 pounds/animal.
[c]Feed prices assigned on as-fed moisture basis: corn $2.24/bu.; cobs $40.00/ton; molasses and Masonex $70.00/ton; soybean meal $240.00/ton; urea and additives $200.00/ton.
[d]Masonex is a wood molasses product of Masonite Corp., which contains tannic acid. The soybean meal was treated with Masonex and hot water for a minimum of 12 hours before use in cattle diets. The Masonex and water were initially blended thoroughly at the rates of 12 and 15 percent of the weight of soybean meal. Formaldehyde when added was at the 0.6 percent level of the soybean meal dry matter.
[e]The soybean meal was heated at 150° C. for 4 hours in a forced-air oven.

EXAMPLE III

The results of a further cattle trial treating soybean meal with various modifying agents are presented in Table E. On a dry matter basis, the three steer diets contained approximately 65 percent corn silage, 26 percent ground corncobs, 4 percent soybean meal, 3 percent corn grain, and 0.7 percent urea plus minerals, vitamin A, and Rumensin. Each diet contained 10 percent crude protein and 65 percent TDN. Contrary to the consistently large responses from soybean meal treatments noted in the experiments of Examples I and II, only small differences were noted over the 112-day period. However, during the initial 70 of the 112-day feeding trial, live weight gains were increased from 4 to 11 percent in cattle receiving treated rather than untreated soybean meal. Feed utilization during this same period was improved from 4 to 5 percent and feed costs of gain decreased from 21 to 20¢ per pound.

TABLE E

Untreated vs. Treated Soybean Meal and Urea Supplementation of Corn Silage Rations. (112-Day Feeding Trial)

| All diets contained 10% crude protein | Diets with 4% SBM + Urea | | |
|---|---|---|---|
| | Untreated meal | Masonex treated[d] | Heat treated[d] |
| First 70 days Cattle initially weighing 475 pounds/animal | | | |
| Daily feed/animal, lb.[a] | 12.9 | 13.6 | 12.8 |
| Daily gain/animal, lb.[b] | 1.81 | 2.01 | 1.87 |
| Imp. over untreated meal + urea | — | 11% | 4% |
| Feed/gain, lb. | 7.10 | 6.76 | 6.84 |
| Imp. over untreated meal + urea | — | 5% | 4% |
| Feed cost/lb. gain[c] | 21 cents | 20 cents | 20 cents |
| Total 112-day period | | | |
| Daily feed/animal, lb.[a] | 13.8 | 14.5 | 13.5 |
| Daily gain/animal, lb.[b] | 2.00 | 2.15 | 1.98 |
| Imp. over untreated meal + urea | — | 7% | None |
| Feed/gain, lb. | 6.89 | 6.72 | 6.80 |
| Imp. over untreated meal + urea | — | 3% | 2% |
| Feed cost/lb. gain[c] | 20.5 cents | 20 cents | 20 cents |

[a]Dry matter basis: corn silage 65%, corncobs 27%, supplement 8%. Moisture content of diet was 46.2%.
[b]Two pens of 6 steers each fullfed each diet.
[c]Feed prices assigned on as-fed moisture basis: corn $2.24/bu.; cobs $40/ton; corn silage $16.50/ton; molasses and Masonex $70/ton; soybean meal $240/ton; urea and additives $200/ton.
[d]See footnotes d and e, Table D.

EXAMPLE IV

Set out below in Table F is a typical diet, designated Diet A, containing non-urea ingredients having more positive than negative UFP and not including any protected protein. Diet A as shown in Table F represents prior feeding practice. The diet is one designed for beef cattle weighing from about 400 to 800 pounds. Table G shows how Diet A can be modified in accordance with the present invention to maximize the protein utilization.

TABLE F

PRIOR ART DIET A CONTAINING NON-UREA INGREDIENTS HAVING MORE POSITIVE THAN NEGATIVE UFP WITHOUT PROTEIN PROTECTION
(For beef cattle 400-700 lb.)

| | DM % | UFP % of DM | MP % of DM |
|---|---|---|---|
| Corncob meal | 60.20 | +0.60 | 0.67 |
| Corn grain meal | 15.00 | +0.18 | 1.08 |
| Cane molasses | 15.00 | +0.30 | 0.34 |
| Soybean meal (unprotected) | 7.00 | −0.75 | 1.20 |
| Mineral and vitamin premix | 1.72 | — | — |
| Urea needed in addition to neg. UFP of soybean meal to satisfy pos. UFP of other dietary constituents | (0.33) | — | — |
| Urea (needed plus excess fed) | 1.08 | 1.08 | — |
| Satisfaction of pos. UFP of diet (1.08 × 2.225) | — | — | 2.40 |
| Total | 100.00 | +1.08 / −1.83 | 5.69 |

TABLE G

DIET A MODIFIED IN ACCORDANCE WITH PRESENT INVENTION: THE SOYBEAN MEAL PROTEIN IS PROTECTED AND ITS PROTECTION IS 100%
(For beef cattle 400-700 lb.)

| | DM % | UFP % of DM | MP % of DM |
|---|---|---|---|
| Corncob meal | 60.20 | +0.60 | 0.67 |
| Corngrain meal | 15.00 | +0.18 | 1.08 |
| Cane molasses | 15.00 | +0.30 | 0.34 |
| Soybean meal (protected) | 7.00 | 0 | 3.06 |
| Mineral and vitamin premix | 1.72 | — | — |
| Urea needed to satisfy pos. UFP of other dietary constituents* | 1.08 | −1.08 | 2.40 |
| Total | 100.00 | +1.08 / −1.08 | 7.55 |

*No excess urea fed.

With respect to the foregoing comparison, it can be seen that when the beef cattle Diet A has no protected protein, as shown in Table F, the minimum level of urea to feed is 0.33% of the ration dry material (DM). When the soybean protein is 100% protected in this diet, as shown in Table G, the amount of urea to feed is increased to 1.08% of the dry matter. The metabolizable protein (MP) was increased from 5.69 to 7.55 by the soybean meal protection and resulting additional urea utilization.

EXAMPLE V

For purposes of a further comparison, Table H below represents a diet designated Diet B, containing more negative than positive UFP without including any protected protein. Diet B as shown in Table H is representative of prior practice in feeding heavy lactating dairy cows. In Table I of this example, Diet B is modified in accordance with the present invention. Specifically, the alfalfa hay and soybean protein are protected, but all other dietary constituents are unprotected.

TABLE H

PRIOR ART DIET B CONTAINING MORE NEGATIVE THAN POSITIVE UFP WITHOUT PROTEIN PROTECTION
(For heavy lactating dairy cows)

| | DM % | UFP % of DM | MP % of DM |
|---|---|---|---|
| Corn silage | 20.00 | +0.13 | 1.11 |
| Alfalfa hay (unprotected) | 35.00 | −1.19 | 1.50 |
| Corn grain meal | 30.00 | +0.35 | 2.15 |
| Soybean meal (unprotected) | 10.00 | −1.08 | 1.72 |
| Cane molasses | 2.00 | +0.04 | 0.05 |
| Mineral and vitamin premix | 2.48 | — | — |
| Urea needed in addition to neg. UFP of soybean meal to satisfy pos. UFP of other dietary constituents | 0 | — | — |
| Urea (fed as excess) | 0.52 | −0.52 | — |
| Satisfaction of pos. UFP of diet (0.52 × 2.225) | — | — | 1.16 |
| Total | 100.00 | +0.52 / −2.79 | 7.69 |

TABLE I

DIET B MODIFIED IN ACCORDANCE WITH PRESENT INVENTION: THE ALFALFA HAY AND SOYBEAN PROTEIN ARE PROTECTED AND ALL OTHER DIETARY CONSTITUENTS ARE UNPROTECTED
(For heavy lactating dairy cows)

|  | DM % | UFP % of DM | MP % of DM |
|---|---|---|---|
| Corn silage | 20.00 | +0.13 | 1.11 |
| Alfalfa hay (protected) | 35.00 | 0 | 5.70 |
| Corn grain meal | 30.00 | +0.35 | 2.15 |
| Soybean meal (protected) | 10.00 | 0 | 4.38 |
| Cane molasses | 2.00 | +0.04 | 0.05 |
| Mineral and vitamin premix | 2.48 | — | — |
| Urea needed to satisfy pos. UFP of other dietary constituents* | 0.52 | −0.52 | 1.16 |
| Total | 100.00 | +0.52 −0.52 | 14.55 |

*No excess urea fed.

In the lactation ration of Diet B, where none of the protein is protected, as shown in Table H, the amount of urea to feed is zero. When both the alfalfa hay and soybean meal proteins are completely protected, as shown in Table I, the minimum level of urea to feed is increased from 0 to 0.52% of the diet dry matter (DM). The useful or metabolizable protein (MP) is increased from 7.69 to 14.55% by protecting both the alfalfa and the soybean meal proteins and the resulting utilization of urea.

EXAMPLE VI

This example illustrates an embodiment in which the unprotected protein is provided by feed materials each of which has a protective UFP. This results in a high positive UFP for the total of the unprotected protein components. The following diet, as set out in Table J is illustrative.

TABLE J

| Ingredients | DM % | Pos. UFP untreated | Neg. UFP from urea |
|---|---|---|---|
| Cobs (ground) | 60.00 | +0.60 | — |
| Corn (ground) | 13.00 | +0.15 | — |
| Cane molasses | 17.50 | +0.35 | — |
| Heated soybean meal$^c$ | 7.00 | — | — |
| Urea | 1.30 | — | −1.30 |
| Minerals + Vitamins | 1.20 | — | — |
| Total | 100.00 | +1.10$^a$ | −1.30$^b$ |

+1.10% = +11 g UFP/kg diet.
−1.30% = 13 g urea/kg diet will more than cover 11 g positive UFP of unprotected feeds.
$^c$100% protected.

EXAMPLE VII

This example illustrates a lactation diet for dairy cattle in which 10% protected soybean meal achieved equal performance to a diet containing 20% unprotected soybean meal. These comparative diets are set out below in Table K.

TABLE K

| DM basis | Diet Composition | |
|---|---|---|
|  | Protected soybean meal diet % | Unprotected soybean meal diet % |
| Soybean meal | 10.00$^a$ | 20.00 |
| Corn silage | 20.00 | 20.00 |
| Oat straw | 20.00 | 20.00 |
| Cobs, gr. | 15.00 | 13.00 |
| Alfalfa pellets | 10.00 | 10.00 |
| Cane molasses | 9.20 | 10.00 |
| Wood molasses | 0.80 | — |
| Corn grain | 12.92 | 5.34 |
| Urea | 0.42 | — |
| Minerals + Vitamins | 1.66 | 1.66 |
| Total | 100.00 | 100.00 |

$^a$Soybean meal treated with wood molasses.

It will be understood that the diet set out in the first column of the above table, the protected soybean meal diet, represents an example of the method of the present invention. The diet set out in the second column of the table, the unprotected soybean meal diet, is representative of prior art practice. As will be noted, the prior art diet contains no protected protein and no urea.

The importance of this example will be apparent to those skilled in the art. Soybean meal is the most expensive of the feed ingredients of the diet compositions set out in Table K. By utilizing the method of this invention, the soybean meal ingredient may be reduced by 50%, thereby considerably reducing the cost of the feed composition.

EXAMPLE VIII

The experimental design consisted of feeding 4 diets, a PC (positive control) and NC (negative control) and 2 containing treated SBM (soybean meal). Heating SBM at 144° C. in pans 25 cm deep for 4 hours in a forced-air oven was one of the treatments (heat-treated). The water lost during heating plus additional water sufficient to make an 82% DM (dry matter) meal was added before mixing in the complete cattle diet. Another treatment consisted of mixing 10% WM (wood molasses) and enough water with SBM to also make an 82% DM meal. This mixture was permitted to cure overnight before mixing in the complete cattle diet. Sufficient water also was added to the SBM used in the PC and NC diets to make an 82% DM meal.

Heifers were fed for a total of 113 days; a first period of 86 days, and a second period of 27 days. The compositions of the diets are shown in Table L. During the last 27 days, the negative control diet was also fed to the animals receiving the Masonex-treated and heat-treated soybean meal during the first 86 days.

The results are shown in Table M.

TABLE L

| Feed Ingredients | Negative control (% DM)$^d$ | Masonex-treated (% DM) | Heat-treated (% DM) | Positive control (% DM) |
|---|---|---|---|---|
| Corncob meal | 59.5 | 59.5 | 59.5 | 60.6 |
| Corn grain meal | 15.0 | 15.0 | 15.0 | 3.5 |
| Sugarcane molasses | 15.0 | 14.3 | 15.0 | 15.0 |
| Masonex (WM) | — | 0.7 | — | — |
| Soybean meal (SBM)$^a$ | 7.0 | 7.0 | 7.0 | 20.0 |
| Urea | 2.0 | 2.0 | 2.0 | — |
| Vitamins and minerals | 1.5 | 1.5 | 1.5 | 0.9 |
| Rumensin$^b$ | 0.04 | 0.04 | 0.04 | 0.04 |

TABLE L-continued

| Feed Ingredients | Negative control (% DM)[d] | Masonex-treated (% DM) | Heat-treated (% DM) | Positive control (% DM) |
|---|---|---|---|---|
| Total digestible nutrients (TDN) | 58.1 | 58.1 | 58.1 | 58.1 |
| Soybean protein | 3.6 | 3.6 | 3.6 | 3.6 |
| Total crude protein | 13.0 | 13.0 | 13.0 | 13.0 |
| Metabolizable protein (MP)[c] | 5.7 | 5.7–7.6 | 5.7–7.6 | 6.8 |

[a] Soybean meal (SBM) treated with either water (negative and positive controls), 10% Masonex, or 144° C. heat.
[b] Rumensin is the trade name of Elanco Products, Indianapolis, IN., for Monensin which was incorporated in the total diets at the rate of 25 ppm.
[c] The metabolizable protein in the treated soybean meal diets will vary depending upon the effectiveness of the treatment agents. If no protection is achieved, then the treated diet will have no more MP than the negative control diet. If 100% protection is achieved, then the treated diet would have the higher values shown in the table.
[d] % dry matter (DM).

TABLE M

| | Negative control | 10% WM | 144° C. Heat | Positive control |
|---|---|---|---|---|
| *First 86 days before negative control cattle consumed MP requirement (380 g) for gain of positive control cattle* | | | | |
| Feed intake (kg/d) | 4.8[c] | 5.1[c] | 5.3[c] | 5.4[c] |
| S.E.[a] | ±.13(2)[b] | ±.13(2) | ±.13(2) | ±.13(2) |
| Avg. initial and final BW (kg) | 200 | 209 | 207 | 209 |
| Daily gain (kg) | .65[c] | .80[ce] | .82[e] | .85[e] |
| S.E. | ±.04(12) | ±.04(12) | ±.04(12) | ±.04(12) |
| Feed per gain (kg) | 7.4[c] | 6.4[d] | 6.5[d] | 6.3[d] |
| S.E. | ±.25(2) | ±.25(2) | ±.25(2) | ±.25(2) |
| *Final 27 days after negative control cattle consumed MP requirement (380 g) for gain of positive control cattle* | | | | |
| Feed intake (kg/d) | 6.6[c] | 7.1[c] | 7.2[c] | 7.3[c] |
| S.E. | ±.21(2) | ±.21(2) | ±.21(2) | ±.21(2) |
| Avg. initial and final BW (kg) | 237 | 255 | 255 | 258 |
| Daily gain (kg) | .81[c] | .89[c] | .91[c] | .92[c] |
| S.E. | ±.03(12) | ±.03(12) | ±.03(12) | ±.03(12) |
| Feed per gain (kg) | 8.0[c] | 8.0[c] | 7.9[c] | 7.9[c] |
| S.E. | ±.21(2) | ±.21(2) | ±.21(2) | ±.21(2) |

[a] S.E. = Standard error of the mean.
[b] Brackets indicated number of observations per treatment.
[c,d,e] Means in the same row having the same superscripts do not differ statistically ($P < .05$)

The diets used in this example are classifiable as low energy diets. The negative control, Masonex-treated, and heat-treated diets were approximately 58% total digestible nutrients (TDN). By using the protected soybean meal (Masonex- or heat-treated), it is found possible to produce finished beef of sufficient fatness to grade USDA choice. In the past, such diets would not have been expected to give this result. Further, even though the feeding of the protected soybean meal was discontinued after the first 86 days, there appeared to be sufficient carry-over benefit to maintain choice beef quality during the final 27 days. It appears possible, therefore, that the method of this invention can be used as a means of producing choice beef with low energy, high roughage diets. Such diets can be characterized as having a TDN of from about 55 to 62%. Where ground corncobs and/or cornstalks are fed as the principal roughage component, the diets may contain from 55 to 65% of these ingredients on a dry matter basis.

We claim:

1. A method of feeding cattle to assure maximized protein utilization, comprising feeding to the cattle a feed ration including a plurality of different naturally-occurring protein-providing feed materials, at least one of said materials being a source of metabolizable protein having a negative Urea Fermentation Potential (UFP) which material has been treated by heat or with aldehyde or tannin to reduce the solubility of the protein and protect it against rumen destruction, the rest of said naturally-occurring protein-providing feed materials being selected from unprotected feed materials at least one of which has a positive UFP and which unprotected feed materials as a group have a net positive UFP, the total of said protected feed materials comprising from 3 to 45% by weight on a dry matter basis of the total of the protected and unprotected feed materials, and also feeding urea in an amount at least equal to the net positive UFP value of said unprotected feed material.

2. The method of claim 1 in which said cattle are beef cattle of under 600 pounds body weight.

3. The method of claim 1 in which said cattle are lactating dairy cattle.

4. The method of claims 1, 2, or 3 in which said protected protein is cereal grain having a negative UFP.

5. The method of claims 1, 2, or 3 in which said protected protein is a vegetable oil meal having a negative UFP.

6. The method of claims 1, 2, or 3 in which said protected protein is a fish meal having a negative UFP.

7. The method of claim 1 in which said cattle are beef cattle having a body weight of 150 to 500 pounds at the start of said feeding.

8. A method of feeding cattle to assure maximized protein utilization, comprising feeding to the cattle a feed ration including a plurality of different naturally-occurring protein-providing feed materials, at least one of said materials being a source of metabolizable protein having a negative Urea Fermentation Potential (UFP) which material has been treated by heat or with aldehyde or tannin to reduce the solubility of the protein and protect it against rumen destruction, the rest of said naturally-occurring protein-providing feed materials being selected from unprotected feed materials at least one of which has a positive UFP and which unprotected feed materials as a group have a net positive UFP from 1 to 20, the total of said protected feed materials comprising from 10 to 25% by weight on a dry matter basis of the total of the protected and unprotected feed materials, and also feeding urea in an amount at least equal to the net positive UFP value of said unprotected feed material.

9. The method of claim 8 in which said cattle are beef cattle of under 600 pounds body weight.

10. The method of claim 8 in which said cattle are lactating dairy cattle.

11. The method of claims 8, 9, or 10 in which said protected protein is cereal grain having a negative UFP.

12. The method of claims 8, 9, or 10 in which said protected protein is a vegetable oil meal having a negative UFP.

13. The method of claims 8, 9, or 10 in which said protected protein is a fish meal having a negative UFP.

14. The method of claim 8 in which said cattle are beef cattle having a body weight of 150 to 500 pounds at the start of said feeding.

15. The method of feeding cattle to assure maximized protein utilization, comprising feeding to the cattle a feed ration including a plurality of different naturally-occurring protein-providing feed materials, at least one of said materials being a source of metabolizable protein having a negative Urea Fermentation Potential (UFP) which material has been treated by heat or with aldehyde or tannin to reduce the solubility of the protein and protect it against rumen destruction, the rest of said naturally-occurring protein-providing feed materials being selected from unprotected feed materials at least one of which has a positive UFP and which unprotected feed materials have a net positive UFP up to 3.0, and also feeding urea in an amount at least equal to the net positive UFP value of said unprotected feed material.

16. The method of claim 15 in which said cattle are beef cattle having a body weight of from 150 to 500 pounds at the start of said feeding.

17. A method of feeding cattle a low energy diet while assuring maximized protein utilization, comprising feeding to the cattle a feed ration including a plurality of different naturally-occurring protein-providing feed materials, said feed ration providing total digestible nutrients (TDN) of from 55 to 62% on a total dry matter basis, at least one of said materials being a source of metabolizable protein having a negative Urea Fermentation Potential (UFP) which material has been treated by heat or with aldehyde or tannin to reduce the solubility of the protein and protect it against rumen destruction, the rest of said naturally-occurring protein-providing feed materials being selected from unprotected feed materials at least one of which has a positive UFP and which unprotected feed materials as a group have a net positive UFP, the total of said protected feed materials comprising from 3 to 45% by weight on a dry matter basis of the total of the protected and unprotected feed materials, and also feeding urea in an amount at least equal to the net positive UFP value of said unprotected feed material.

18. The method of claim 17 in which said feed ration contains as the principal component thereof on a dry matter basis a roughage material selected from the class consisting of corncobs, cornstalks, and mixtures thereof.

* * * * *